Aug. 21, 1956 H. R. FOSTER ET AL 2,759,999

INTER-COMMUNICATING TELEPHONE SYSTEMS

Filed Oct. 23, 1952

Inventors
Harry R. Foster
& Elmo E. Crump.

BY A. D. T. Libby
Attorney.

United States Patent Office 2,759,999

Patented Aug. 21, 1956

2,759,999

INTER-COMMUNICATING TELEPHONE SYSTEMS

Harry R. Foster, Lake Valhalla, and Elmo E. Crump, West Caldwell, N. J., assignors to Ohmega Laboratories, Pine Brook, N. J., a partnership Application October 23, 1952, Serial No. 316,338

7 Claims. (Cl. 179—1)

This invention relates to an inter-communication telephone system such as a master station with scattered branches. In such systems, at least one of which we are familiar with by daily use in a factory, wherein loud speakers are used to call a person to a phone or send a message thereto, it is necessary to operate a switch to control the circuit while talking or listening, so the energy coming from the loud speaker will not be fed back into the line and disturb the persons on the line as such feed back from the loud speaker will go into the local transmitter and be carried back into the receiver of the one putting in the call. In these systems amplifiers are used and the loud speaker will set up oscillations in the communication loop and to prevent this a switch is used to cut out such oscillations. Practically everyone is familiar with the fact that if a telephone receiver is placed over the mouthpiece of a transmitter while a message is coming over the line the receiver will start "howling."

It is one of the objects of our present invention to provide an inter-communicating system so that one can receive and transmit messages without being disturbed by such oscillations as might be set up in a loud speaker.

Our improved system to be described, is fundamentally based on the fact that speech can be split up into small segments in the frequency spectrum and still be clearly intelligible. We have discovered that by heterodyning the audio frequencies to a higher frequency, say at about 200 kc. by a local oscillator and then splitting the heterodyne wave by means of crystal filters and then passing these frequencies to a demodulator and to an audio-amplifier, a loud speaker may be operated.

Figure 1:
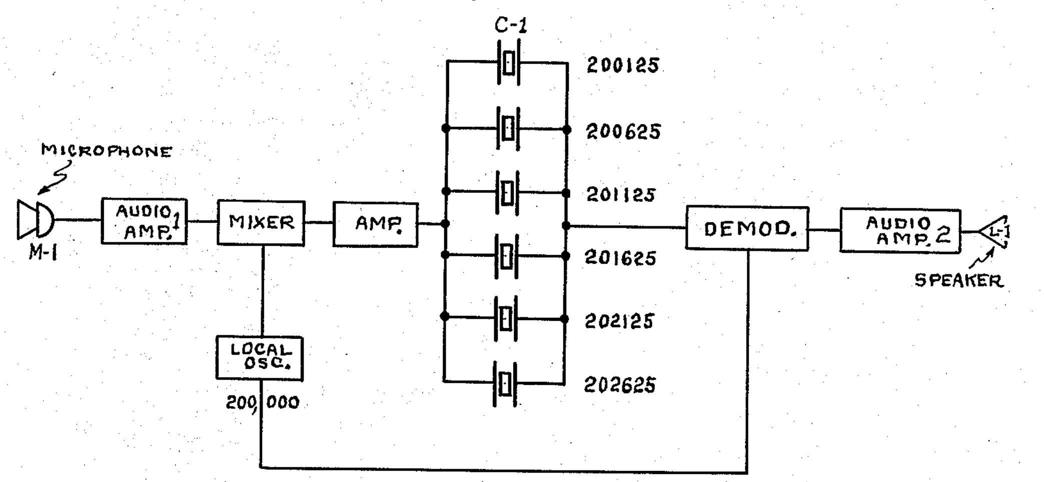
Figure 2:
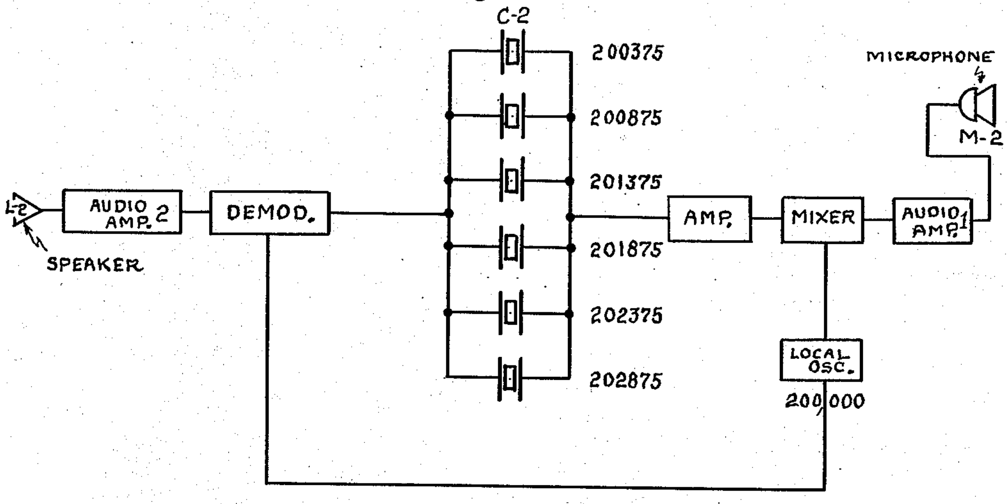

The system is set forth in the drawing in which Figure 1 shows speech transmission in one direction while Figure 2 shows transmission between the same stations in the opposite direction.

In Figure 1 a microphone M–1 into which a person will talk, is connected to an audio-amplifier 1 which is connected to a mixer after which the speech may be amplified, if desired, before going to a group of filters such as crystals C–1, which we prefer to use, six being shown, adjusted 500 cycles apart whereby gaps in the spectrum will be found every 500 cycles. The frequencies 500 cycles apart coming from the filters C–1 having a band width of 250 cycles, are then demodulated down to the audio amplifier 2 where they are amplified and sent out to a loud speaker L–1. An oscillator, say of 200,000 cycles is connected between the mixer and demodulator. Now, in Figure 2 a reverse operation takes place but with frequencies that were eliminated in Figure 1, for example, if frequencies of 625 cycles apart, be sent into the microphone M–1 of Figure 1 they will come out to the loud speaker L–1 but will not be allowed to pass back through M–2 but only those frequencies that were eliminated by the filters in Figure 1.

While we have mentioned a frequency of 200,000 cycles, it is obvious that there are others that can be used. From what has been said it will be seen that two persons can talk over this system which includes transmitters and loud speakers at a desired frequency which will cause no disturbance and require no switches to operate while talking.

Having thus described our invention, what we claim is:

1. An inter-communicating telephone system including, a plurality of filters adjusted to pass predetermined spaced frequencies and eliminating certain spaced frequencies of the human voice, a speech transmitter, means for heterodyning the speech coming from said transmitter and passing it to said filters, a demodulator for receiving the output frequencies from said filters, an audio-amplifier to receive the output from said demodulator and a loud-speaker connected to the output amplifier.

2. A telephone system as set forth in claim 1 further defined in that a similar transmission circuit arrangement is provided for a person at the said loud-speaker end of claim 1, but modified by the filters being adjusted to pass voice frequencies that were rejected by the first mentioned set of filters.

3. An inter-communicating telephone system between two separated stations comprising two similar circuits each including, a transmitter at one end and a loud-speaker at the other, but arranged in reverse order, one circuit having filters therein which will only pass, to its loud-speaker end, frequencies originating in its transmitter and having spaced relations one to another, while the other circuit will pass, to its end loud-speaker, only frequencies spaced between the frequencies of the filters of the first mentioned circuit.

4. An inter-communicating telephone system having a voice transmitter at one end and a loud-speaker at the other, an audio amplifier connected to the transmitter, a plurality of filters in parallel arrangement, one side of the filters being connected to said amplifier through a mixer while the other side of the filters is connected to a demodulator, an oscillator connected between the mixer and the demodulator, for the purpose described, the filters being adjusted to separate the voice frequencies into spaced frequencies, an audio-amplifier connected to the demodulator and to the loud-speaker to receive the spaced frequencies coming from the last mentioned amplifier.

5. An inter-communicating telephone system as set forth in claim 4 further defined in that the filters are set to pick out frequencies approximately 500 cycles apart.

6. An inter-communicating telephone system as set forth in claim 4 further defined in that the system includes two similar circuits but having their elements connected in reverse positions and the filters of one circuit being adjusted to respond to frequencies not utilized by the other circuit.

7. An inter-communicating telephone system as set forth in claim 4 further defined in that an amplifier is connected between the mixer and the filters which are adjusted to pass frequencies preferably spaced 500 cycles apart.

References Cited in the file of this patent

UNITED STATES PATENTS

| | | |
|---|---|---|
| 1,550,660 | Affel | Aug. 25, 1925 |
| 1,739,494 | Affel | Dec. 17, 1929 |
| 1,741,363 | Green | Dec. 31, 1929 |
| 1,968,450 | Heising | July 31, 1934 |
| 2,113,765 | Murphy | Apr. 12, 1938 |
| 2,553,610 | Singleton | May 22, 1951 |